United States Patent
Myer et al.

[15] 3,684,979
[45] Aug. 15, 1972

[54] TRANSVERSE DYE LASER STIMULATION WITH A PULSED NITROGEN LASER

[72] Inventors: James A. Myer, Woburn; Ramesh D. Sharma, Medford; Edward J. Kierstead, Saugus, all of Mass.

[73] Assignee: Avco Corporation, Cincinnati, Ohio

[22] Filed: Nov. 24, 1969

[21] Appl. No.: 879,285

[52] U.S. Cl. .................................................. 331/94.5
[51] Int. Cl. .................................................. H01s 3/20
[58] Field of Search ............. 331/94.5; 350/293, 294; 313/108 D

[56] References Cited

UNITED STATES PATENTS

| | | | |
|---|---|---|---|
| 2,410,550 | 11/1946 | Padva | 350/293 |
| 3,530,400 | 9/1970 | Pratt, Jr. et al. | 331/94.5 |
| 3,396,344 | 8/1968 | Broom | 313/108 D |
| 3,543,179 | 11/1970 | Wilson | 331/94.5 |
| 3,568,087 | 3/1971 | Phelan, Jr. et al. | 331/94.5 |

OTHER PUBLICATIONS

Schafer et al., Organic Dye Solution Laser. Applied Physics Letters Vol. 9, No. 8 (Oct. 15, 1966) pp. 306–309

Sorokin et al., Stimulated Emission Observed from an Organic Dye, Chloro–aluminum Phthalocyanine–IBM Journal, March 1966, pp. 162–163

*Primary Examiner*—William L. Sikes
*Attorney*—Charles M. Hogan and Melvin E. Frederick

[57] ABSTRACT

Stimulated emission of radiation (laser action) is produced in materials generally classed as dyes and scintillators. A cavity or cell of the dye materials in solid or liquid solution or as a vapor is pumped or excited with 3371 angstroms radiation, focused to a line with a cylindrical lens from a rectangular beam of such radiation produced with a pulsed crossed field nitrogen gas laser. The focused line, which is transverse to the beam produced by the exciting laser, lies near the surface of the dye material in the cell, and the cell is substantially as long as the line. The cell lies within an intensifying optical cavity formed by a 100 percent reflecting mirror and a partially reflecting output mirror, both perpendicular to the line of focus of the pumping radiation. The stimulated emission from the dye material is characterized by a short pulse width and little loss of energy in the coupling between the two lasers. High pulse rates without dye circulation, and high conversion efficiencies of the dyes when so pumped, are obtained. For frequency adjustment the optical cavity substitutes for the 100 percent mirror a grating or Littrow prism at the appropriate angle. Further spectral narrowing is obtained by inserting a tilted Fabry-Perot etalon in the cavity. By using such a frequency tuner and a plurality of dye materials which emit stimulated radiation over different portions of the spectrum, the present device can provide laser radiation over virtually the whole visible spectrum and into the infrared and ultraviolet.

12 Claims, 6 Drawing Figures

PATENTED AUG 15 1972 3,684,979

JAMES A. MYER
RAMESH D. SHARMA
EDWARD J. KIERSTEAD
INVENTORS

BY Charles M. Hogan
Melvin E. Frederick

ATTORNEYS

PATENTED AUG 15 1972 3,684,979

JAMES A. MYER
RAMESH D. SHARMA
EDWARD J. KIERSTEAD
INVENTORS

BY Charles W. Morgan
Melvin E. Frederick
ATTORNEYS 3,684,979

TRANSVERSE DYE LASER STIMULATION WITH A PULSED NITROGEN LASER

BACKGROUND OF THE INVENTION

The field of this invention relates to the production of stimulated radiation in materials which are dyes or which have properties similar to those of dyes, and to methods and apparatus for producing such stimulated radiation.

It has been known for a number of years that stimulated emission can be produced in various organic solutions. The first such solution were of dyes, as reported by Sorokin et al, IBM Journal, Volume II, page 130, Mar. 1967, and since that time devices which have been used to produce such stimulated radiation have been commonly known as "dye lasers" even though the materials emitting the radiation could not be classified as "dyes" in the true definition of the word. Some materials which fluoresce or scintillate outside the visible spectrum have been used, for example. A compendium of materials which have served as the active medium in dye lasers is given both in the above cited article of Sorokin et al, and in the review of Kagan et al, Laser Focus, page 26, Sept. 1968. Because the term "dye laser" has become commonplace, it is used herein, but with the understanding that the active laser medium can be other than a dye.

The characteristics of dye lasers which make them attractive are the possibility of wide spectral range and tunability at low cost. One can operate the laser anywhere in the visible or into the ultraviolet or infrared simply by changing to a solution which emits at the desired spectral output. The cost of the material is minimal, certainly far less than the cost of a group of conventional lasers emitting at different wavelengths, and also less than the cost of frequency doublers and other such devices. The output wavelength of a dye laser also is tunable, either by varying the concentration of the solution, by varying the solvent, or by introducing a wavelength selective element such as a grating reflector into the optical cavity to control the emission wavelength. Significant spectral narrowing without significant energy reduction is an additional benefit obtained with the use of a grating reflector: line widths less than 1 angstrom can be obtained in contrast to the 50–200 angstroms which are typical of dye laser emission.

Typical dye lasers used in an effort to obtain these characteristics have beem pumped with Q-switched ruby or glass lasers, frequency doubled, or in a few cases pumping has been accomplished with flash lamps. Pumping has been either in a longitudinal geometry, in which the pumping radiation is colinear with the optical cavity axis and stimulated radiation, or in a transverse geometry, with the excitation at right angles to this axis.

Dye lasers have thus far fallen short of achieving their full potential, however, because (1) a number of useful materials are difficult to pump due to low quantum efficiency or high excited state losses due to singlet-triplet transitions or to triplet absorptions, (2) low conversion efficiencies, high coupling energy losses, and low repetition rates are attained due to thermal effects induced during pumping, and (3) dye circulation problems and limitations are posed by these thermal effects.

SUMMARY OF THE INVENTION

Objects of the present invention are to provide a dye laser capable of producing stimulated emission in the form of short pulses over a broad spectrum at high repetition rates, with frequency tuning, and which is an economical, practical device with high pumping efficiency and low energy coupling loss.

According to the invention these objects are achieved in a dye laser which has a laser pump emitting a pulsed rectangular beam of exciting or pumping radiation, which beam is focused to a line by a cylindrical lens or mirror. The line of focus of pumping radiation is directed to lie within a segregated quantity or cell of lasing material, which can be an organic dye or similar material. Optical cavity means to intensify stimulated radiation emitted along the focused line are provided with a reflecting axis perpendicular to the pumping radiation. In preferred embodiments, the laser pump is a crossed field gas laser, more particularly a pulsed nitrogen gas laser emitting at 3371 Angstroms, the dye cell is substantially as long as the line of focus of the pumping radiation, the line of focus of pumping radiation is positioned near the surface of the dye cell, and the optical cavity means includes wavelength selective means such as a grating reflector to tune the output frequency.

These and other objects and novel aspects of the invention will be apparent from the following description of preferred embodiments.

DESCRIPTION OF THE PREFERRED EMBODIMENT

Figure 1:
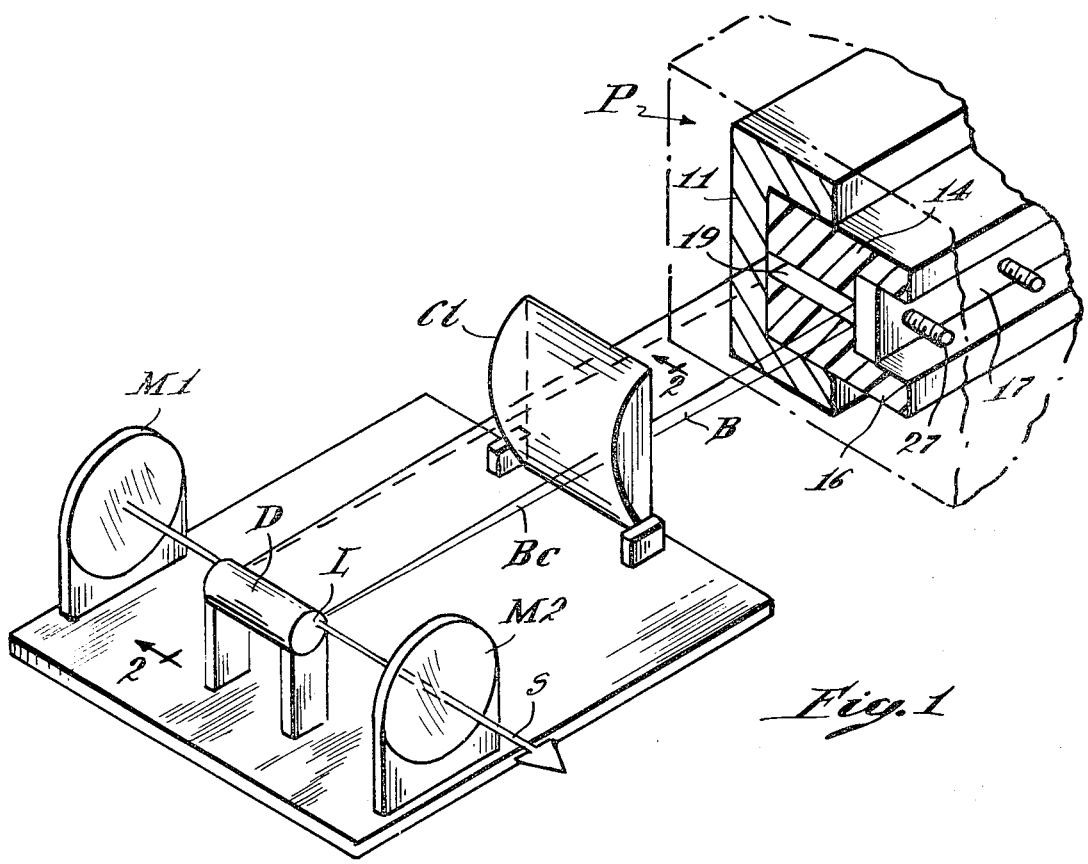
FIG. 1 is isometric diagram of the invention.

FIG. 1 illustrates, in diagrammatic form, the elements which comprise the dye laser according to the invention. A laser pump P emits a rectangular beam B of coherent, collimated pumping radiation in pulse form. The rectangular beam B is converged in one dimension as shown at Bc by a cylindrical lens C1 and is focused to a line L of pumping radiation which is at right angles to the beam B. A dye cell D of laser material, approximately as long as the line L, is positioned so that the line L lies within it to bring about the excitation to higher energy levels and the necessary population inversion for stimulated emission to occur in the laser material. A simple optical cavity for intensification of stimulated radiation in the laser material is formed by a 100 percent planar reflecting mirror M1 and a 98 percent planar mirror M2, both of which are perpendicular to line L. The stimulated radiation, at a wavelength determined by the laser material in the dye cell, passes through the mirror M2 as the output beam S of the dye laser.

LASER PUMP

The source of pumping radiation in the present invention is the laser pump P which preferably is a pulsed cross field gas laser either using nitrogen ($N_2$) as the discharge gas and emitting at 3371 angstroms in the ultraviolet, or using neon as the discharge gas and emitting at 5401 angstroms in the green. A suitable example of such a laser is that invented by Leonard and described in co-pending application Ser. No. 536,094, filed Mar. 21, 1966 now U.S. Pat. No. 3,553,603. Further description of this device is to be found in the articles by Leonard and Gerry in Applied Physics Letters, Volume 7, No. 1, pages 4 and 6, July 1965. A commercial version of this laser is provided either by Avco Model C530 pulsed gas laser or by Avco Model C950 pulsed gas laser.

The laser pump P of the above type, as described more fully in the above co-pending application, is constructed with a U-shaped aluminum base electrode 11 of two meters length, two spaced Lucite side walls 14 and 16 facing each other within the base electrode, and an alumunium electrode 17 carried by the side walls 14 and 16. Through the rectangular duct 19 formed between electrodes 11 and 17 and between side walls 14 and 16, a supply of gas is flowed at low pressure, and a pulsed electric field is applied across electrodes 11 and 17 to cause the pulsed rectangular laser beam B to be emitted. For purpose of the present invention the gas flowed through duct 19 is preferably nitrogen, which produces radiation at 3371 Angstroms in the ultraviolet for efficient pumping of most laser materials in the dye cell D, but it can also be neon, which emits at 5401 Angstroms in the green and is suitable for pumping of some materials, specifically materials which emit in the near infrared. Further details of operation of laser pump P appear in the places mentioned above. The following table summarizes typical performance characteristics of the laser pump P of the above type, employing nitrogen as the discharge gas.

NITROGEN LASER PUMP CHARACTERISTICS

| | |
|---|---|
| Output wavelength | $\lambda = 3371 A$ |
| Bandwidth | $\gamma\lambda \leq 1A$ |
| Peak output power | 100kW |
| Effective pulse widths | 10 nanoseconds |
| Energy per pulse | 0.001 joules |
| Output beam dimension | 1/8" × 2" |
| Pulse repetition rate | 0 to 100 pps |

The high peak power and rapid pulse rise time, as well as the high possible repetition rate, all contribute to the excellent results of use of such a device as a source of pumping radiation, and it is believed that the favorable results obtained with the dye laser of the present invention are in substantial measure due to use of this crossed field nitrogen gas laser as a source of pumping radiation.

Figure 2:
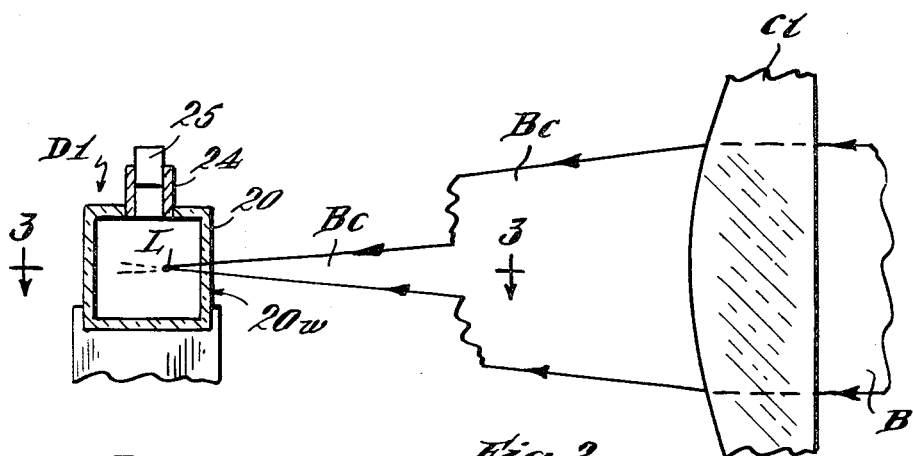
FIG. 2 is an elevation of a portion of the invention on section line 2—2 of FIG. 1, showing one embodiment of a dye cell.
Figure 5:
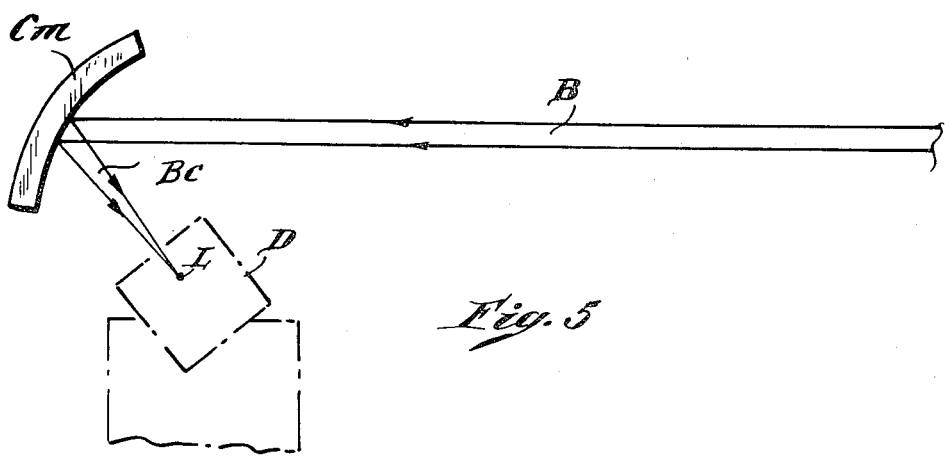
FIG. 5 is a section, similar to the section of FIG. 2, showing another manner of focussing.

Further focusing aspects of the pumping arrangement are shown in FIGS. 2 and 5. FIG. 2 illustrates how the parallel waves of the rectangular beam B are converged by the cylindrical lens C1 in the narrow (1/8 inch) beam dimension into the line L, the end view of which appears in FIG. 2. As an alternative, FIG. 5 illustrates how the parallel waves of the rectangular beam B can be converged by a cylindrical mirror Cm into the line L. The position of the line of focus L within dye cell D can be varied to suit the material in the dye cell D. For materials which lase only with difficulty, due to low quantum efficiency or excited state losses, highly concentrated pumping energy is desirable. Because many of these difficult laser materials in the dye cell D have a short absorption length in the concentrations which produce optimum power, it has been found preferable for these materials to locate the focus line L near the surface of the laser material so there will be little absorption loss to reduce the intense concentration of pumping energy potentially available at focus line L. Typical distances between the line L and the surface of these difficult lasing materials have been on the order of a few hundredths to a few tenths of a millimeter. For materials which lase readily, highly concentrated pumping energy may produce the undesirable condition of super-radiance, in which radiation is emitted uncontrolled by the optical cavity. For such materials the focus line L is located further from the surface of the material so that the energy concentration in the active medium is reduced by an increase in lasing volume.

DYE CELL

Figure 4:
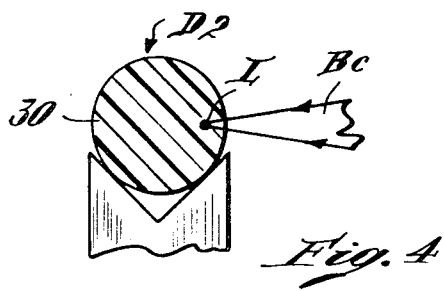
FIG. 4 is a section, similar to the section of FIG. 2, showing another dye cell embodiment.
Figure 3:
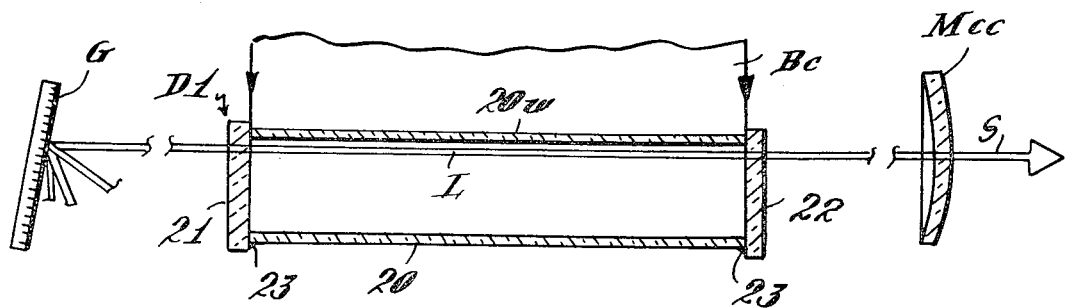
FIG. 3 is a section on line 3—3 of FIG. 2, showing a tunable optical cavity.

FIGS. 2, 3 and 4 illustrate two examples of construction D1 and D2 for dye cell D. The example D1 of FIGS. 2 and 3 is designed to hold a liquid solution of laser material and comprises a container for the liquid formed by a square cylindrical tube 20 of optical quality quartz with parallel quartz optical flats 21 and 22 closing the open ends of the tube 20. The flats 21 and 22 are either formed integral with tube 20 or are adhered to it with a suitable adhesive 23. The laser material, for example one of the organic dyes in a solvent, can be introduced into the closed tube through a fill pipe 24 with plug 25. If desired, separate dye cells with a permanent fill of laser material can be made and the fill pipe omitted. For dyes which deteriorate with use, means can be provided by circulating the dye solutions through the tube 20.

The tube material is selected to be non-absorbing at the pumping wavelength, and quartz is suitable for 3371 Angstroms. The tube material is of optical quality, at least in front wall 20w, to prevent abberations in the focus line L. In similar fashion, the end flats 21 and 22 are selected to be non-absorbing at the wavelength of the stimulated radiation, and are similarly of optical quality to prevent abberations. Both tube 20 and flats 21 and 22 have an antireflective coating to prevent losses at the air-quartz interface. In matching the optical properties of tube 20 and flats 21 and 22 to the lasing material, it is preferable to closely match indices of refraction. In choosing adhesive 23, it is important to select one that will not be attacked by solvents used in the lasing material, to avoid contamination of the material.

The size of the dye cell D1 is chosen with two criteria in mind: To make most effective use of the pumping radiation concentrated in line L, the dye cell is preferably the same length as line L (see FIG. 3) so that no pumping energy will be wasted (as it would if the cell is too short) and so that the laser material will not self-absorb or scatter the stimulated radiation in unexcited regions (as it would if the cell is too long). The volume of lasing material to be placed in the dye cell is determined by volumetric effects such as dissipation of thermal energy and internal flow. One of the advantages of the present invention, to be discussed below, is that thermal problems are reduced and small volumes can be pumped at a high rate without circulation. As an example of dimensions for a dye cell D1 of the type illustrated in FIGS. 2 and 3, the length of tube 20 was 2 inches to match the width of pumping beam B, tube outside dimensions were ½ inch by ½ inch, and the wall thickness was 1 mm.

The dye cell D2 illustrated in FIG. 4 is a right circular cylinder 30 made from a solution of laser material, e.g., rhodamine 6G or fluorescein. The solid solvent, which is typically a plastic such as polymethyl methacrylate, should be non-absorbing to the wavelength of the pumping radiation, and the surface of the cylinder 30 should be optically smooth to prevent abberations in both the pumping and stimulated beams. The length and volume of cylinder 30 in dye cell D2 are chosen according to the same criteria as the length and volume of dye cell D1.

Although dye cells D1 and D2 have been described as square and circular cylinders, respectively, these shapes are interchangeable and are selected for convenience only. Other shapes can also be used. It should be noted, however, that shapes with flat surfaces are generally easier to make optically smooth.

In addition to the liquid solutions of laser materials for which dye cell D1 is designed, and the solid solutions from which dye cell D2 is made, the dye laser of the present invention also can be used with lasing materials in vaporous form or in gaseous solution. Depending on the concentrations desired, such a vapor could be contained in a dye cell similar to D1, possibly with the addition of an external heater, or possibly with inlet or outlet ports for a steady flow of the vapor through the cell from an outside source of it. The optical qualities and length of a cell designed to accommodate a vapor would be selected according to the criteria mentioned above for dye cells D1 and D2.

OPTICAL CAVITY

The radiation stimulated in the laser material in dye cell D is intensified by an optical cavity having its reflecting axis parallel to line L and transverse to the direction of the pumping beam B. As mentioned above and as shown in FIG. 1, the optical cavity can be comprised of two planar mirrors M1 and M2, one of which (M1) is preferably 100 percent reflecting for greatest intensification, and the other of which (M2) is partially transmitting (e.g., 98 percent reflecting) to permit output beam S of stimulated radiation to exit from the device.

As shown in FIG. 3 the mirror M1 of the optical cavity can be replaced with a grating reflector G to provide wavelength tuning. The criteria to be followed in selecting the properties of grating G will depend to some extent on the use to which the output beam S is to be put, but it is generally desirable to select a grating which is efficient at the wavelengths of interest and with blaze selected for highest energy, and with high resolution and dispersion to produce an output of greatest monochromaticity. The relationships of groove spacing and number, and blaze, to produce these results are well known to optics and need not be repeated here. Tuning is achieved, as is well known, by varying the angle of the grating until the desired wavelength is obtained. Other wavelength selective elements, for example a Littrow prism, can also be substituted for mirror M1.

Figure 6:
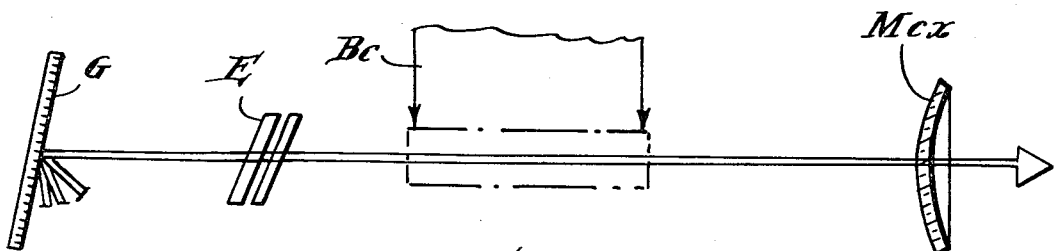
FIG. 6 is a section, similar to the section of FIG. 3, showing another tunable optical cavity.

For further spectral narrowing a transmission filter can be inserted in the optical cavity. FIG. 6 illustrates the use of a Fabry-Perot etalon E positioned at an appropriate angle to the cavity axis to pass radiation of the desired frequency. The tilted partially reflecting inner surfaces of this etalon E form a resonant cavity which provides spectral narrowing to a high degree, and line widths on the order of 0.01 Angstrom in output beam S are obtainable with such a device.

As shown in FIG. 3 the planar mirror M1 of the optical cavity can be replaced with a concave mirror Mcc if an increase in cavity stability is desired. As shown in FIG. 6, the planar mirror M1 can also be replaced with a convex mirror Mcx to form an unstable cavity which will help to suppress any unwanted modes.

OPERATION AND RESULTS

The dye laser arranged as described above has been tested with a variety of laser materials. It was found that high conversion efficiencies could be obtained. Moreover, the extremely short pulse widths and the fast repetition rate without need of dye circulation which were obtained are two unique and valuable features of the present scheme. Use of a diffraction grating instead of a 100 percent reflecting mirror for one end of the optical cavity permitted the laser wavelength to be tuned and also permitted the effective wavelength range of each dye to be extended. Tuning of the radiation to a narrow band path resulted in no apparent loss of efficiencies at the wavelengths of the natural fluorescence, but there was observed a definite variation of efficiency with wavelength. Efficiency is also a function of concentration of the dye, and the output spectral distribution is also a function of concentration. The rapid pulse rate with little loss in efficiency and without dye circulation which is obtainable in the present invention indicates that the recovery of the dyes must be fast when pumped in the manner described above.

Typical test results using the dye laser of the present invention are summarized in the table below. The concentrations of the various dyes were selected for maximum conversion efficiency, the concentrations generally being on the order of $10^{-3}$ to $10^{-4}$ moles/per liter. Conversion efficiency is the ratio of the nitrogen laser power to the dye laser power. The table below lists, as a function of wavelength, peak power ratios, i.e., the peak power of the dye laser pulses divided by the peak power of the nitrogen laser pulses.

CHARACTERISTICS OF DYE LASER EXCITED BY PULSED $N_2$ Laser

| Dye/Solvent | Spectral Range (A) | Peak Power Ratio | Pulse Width Nano-Seconds) |
|---|---|---|---|
| Rhodamine 6G/ ethyl alcohol | 6200–5650 | 0.22 at $\lambda = 6000$ | 4 |
| | | 0.12 at $\lambda = 5750A$ | 4 |
| 4-methylcoumarin 7-diethylamino/ ethyl alcohol | 4900–4450 | 0.25 at $\lambda = 4650A$ | 5 |
| | | 0.27 at $\lambda = 4500A$ | 5 |
| POPOP/ tetrahydrofluran | 4450–3900 | 0.13 at $\lambda = 4650A$ | 8 |
| | | 0.18 at $\lambda = 4500A$ | 8 |
| $\alpha$-NOPON/ benzene | 4450–4300 | 0.18 at $\lambda = 4000A$ | 6 |

| | | |
|---|---|---|
| Fluorescein*/ | 6000–5200 0.20 at λ = 6000A | 4 |
| H₂O | 0.03 at λ = 5500A | 7 |
| 4-methyl- | 5300–4450 0.17 at λ = 5200A | 10 |
| umbelliferone/H₂O | 0.18 at λ = 4600A | 10 |
| Dephenyl-anthracene | 4500–4350 0.08 at λ = 4500A | 2 |
| /cyclohexane | λ = 4370A | 5 |
| Diphenyl-stilbene/ | 4200–4000 0.23 at λ = 4050A | 8 |
| toluene | | |
| α-NPO/benzene | 3950–3900 0.12 at λ = 3850A | 8 |

*can also be stimulated by 5401A Ne laser

As the above table makes clear, the present dye laser combines higher peak power ratios with short pulse width and rapid pulse rates to make this a very valuable method of stimulating radiation in dyes. By providing a variety of different dyes in different interchangeable dye cells, it can be appreciated that the present dye laser will permit a broad spectral range to be covered at high efficiencies simply by replacing dye cells and by making simple adjustments in the grating G.

It should be understood that the present disclosure is for the purpose of illustration and that the invention includes all modifications within the scope of the appended claims.

What is claimed is:

1. Apparatus for producing stimulated radiation in the near ultraviolet and throughout the visible spectrum in lasable dye materials comprising:
   a. laser pumping means emitting a rectangular beam of pumping radiation in the ultraviolet in pulse form, said laser pumping means comprising a rectangular duct through which a gas is flowed, and electrode means for impressing a pulsed electric field in said duct and through said gas, thereby to cause a pulsed rectangular beam of radiation to be emitted from said duct;
   b. a cell comprising a container for said lasable dye material, said container comprising a closed tube with an optically smooth side wall substantially nonabsorbing at the wavelength of the pumping radiation, and optically smooth end walls substantially nonabsorbing at the wavelength of the radiation emitted from said lasable dye material;
   c. focusing means positioned to focus said rectangular beam substantially to a line and substantially as long as said cell side wall, said focusing means being positioned with respect to said cell that said line of focus is located within said lasable dye material adjacent said cell side wall a distance substantially proportional to the pumping energy required to cause said lasable dye material to lase; and
   d. wavelength selective optical cavity means spaced from said cell for intensifying stimulated radiation emitted from said laser material substantially only along said line of focus, said optical cavity means having a reflecting axis substantially coincident with said line of focus of pumping radiation, said optical cavity means comprising a pair of facing reflecting means with said cell disposed therebetween, one of said reflecting means being adjustably wavelength selective whereby only stimulated radiation of predetermined wavelengths may be intensified in said optical cavity means, and the other reflecting means is partially transmitting to stimulated radiation of said predetermined wavelengths to pass said stimulated radiation to a region outside said optical cavity means.

2. Apparatus according to claim 1 wherein said emitted radiation has a wavelength of 3371 A.

3. Apparatus according to claim 1 wherein said gas discharge laser emits pulses with a duration of substantially 10 nanoseconds, and a peak power of substantially 100 kW.

4. Apparatus according to claim 1 wherein said focusing means comprises a cylindrical lens, wherein said rectangular beam is elongated, and wherein said cylindrical lens converges the rectangular beam in the shorter dimension.

5. Apparatus according to claim 1 wherein said focusing means comprises a cylindrical mirror and said cylindrical mirror converges the rectangular beam in the shorter dimension.

6. Apparatus according to claim 1 further comprising a transmission filter in said optical cavity.

7. Apparatus according to claim 6 wherein said transmission filter is an etalon.

8. Apparatus according to claim 1 wherein said partially reflecting means is a concave mirror.

9. Apparatus according to claim 1 wherein said partially reflecting means is a convex mirror.

10. Apparatus according to claim 1 wherein said wavelength selective reflecting means is a diffraction grating.

11. Apparatus according to claim 1 wherein said cell comprises a solid solution of said laser material.

12. Method of producing stimulated radiation in lasable dye materials comprising:
   a. providing a rectangular beam of pumping radiation in pulse form;
   b. focusing said rectangular beam substantially to a line of focus;
   c. positioning a cell of said lasable dye material with said line of focus of pumping radiation therewithin and a surface of said cell parallel to said line and said line of focus located in said lasable dye material adjacent said surface a distance substantially proportional to the pumping energy required to cause said lasable dye material to lase;
   d. intensifying only stimulated radiation of a predetermined wavelength of the stimulated radiation emitted from said lasable dye material substantially only along said line in an optical cavity having a reflective axis coincident with said line of focus of pumping radiation; and
   e. extracting only stimulated radiation of said predetermined wavelength from said optical cavity.

* * * * *

PO-1050
(5/69)

UNITED STATES PATENT OFFICE
CERTIFICATE OF CORRECTION

Patent No. 3,684,979  Dated  August 15, 1972

Inventor(s) James A. Myer, Ramesh D. Sharma and Edward J. Kierstead

It is certified that error appears in the above-identified patent and that said Letters Patent are hereby corrected as shown below:

Column 3, line 45, for "Bandwidth $\gamma\lambda \leq 1A$" read --Bandwidth $\Delta\lambda \leq 1A$--; Column 5, line 10, after "a" read--solid; and Column 6, first line in Table, for "0.22 at $\lambda$ = 6000" read--0.22 at $\lambda$ = 6000A--.

Signed and sealed this 19th day of February 1974.

(SEAL)
Attest:

EDWARD M. FLETCHER, JR.  C. MARSHALL DANN
Attesting Officer  Commissioner of Patents